Dec. 18, 1956     J. J. SHACKELFORD     2,774,338
ELECTRO-MECHANICAL VALVE CONTROL MECHANISM
Filed June 3, 1953     2 Sheets-Sheet 1
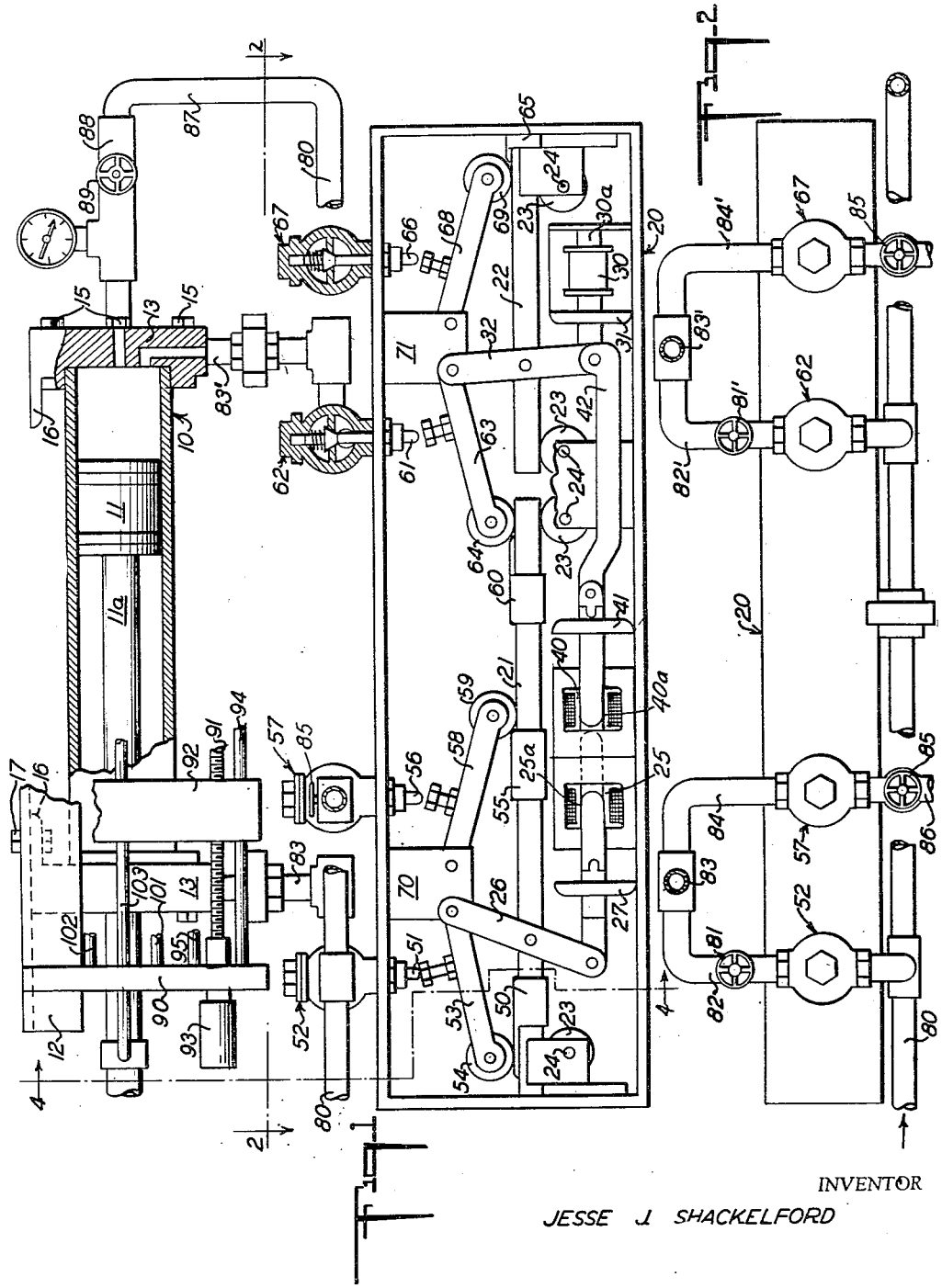
INVENTOR
JESSE J. SHACKELFORD
BY Fisher & Christen
ATTORNEYS

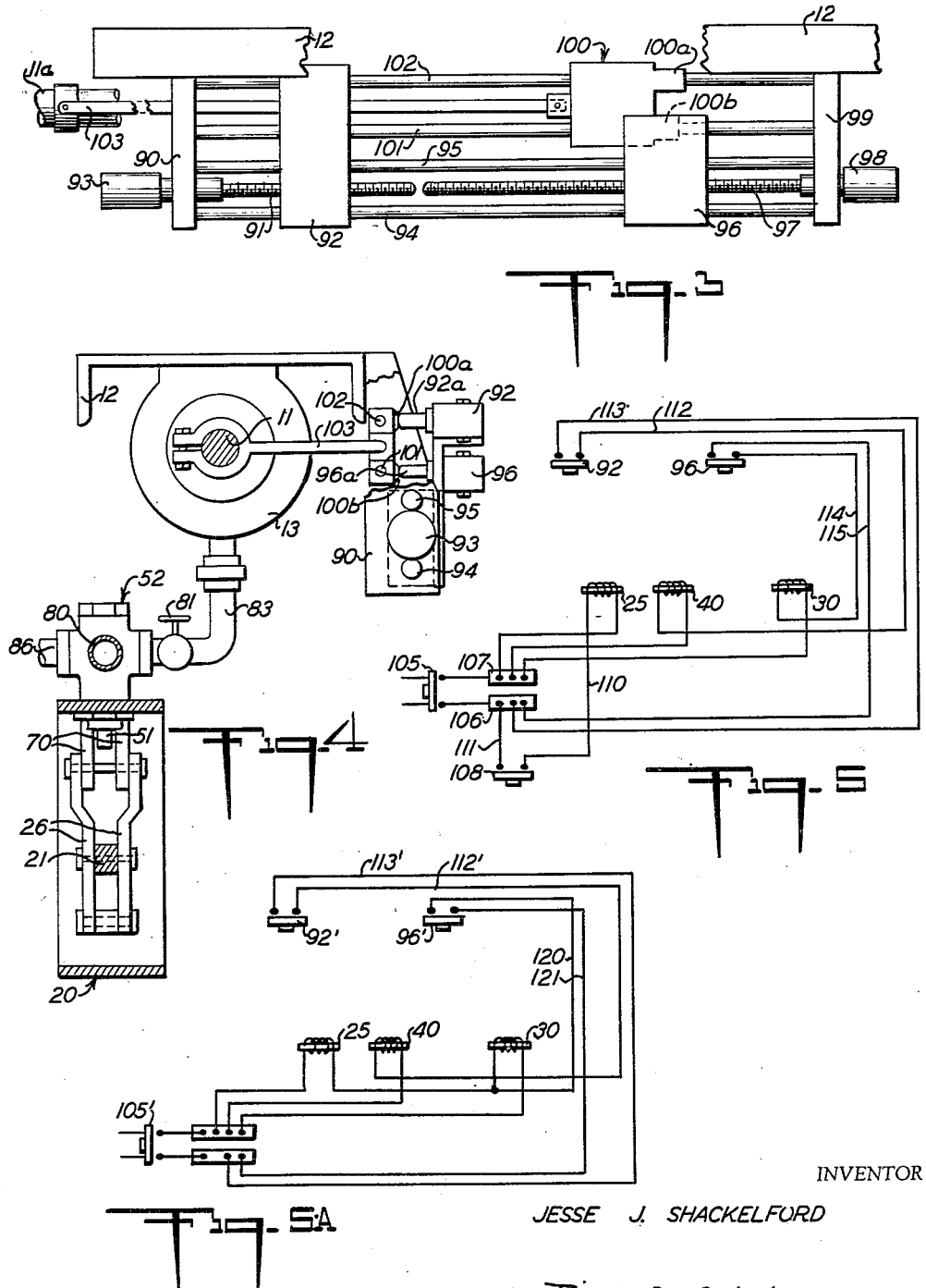

United States Patent Office 2,774,338
Patented Dec. 18, 1956

2,774,338

ELECTRO-MECHANICAL VALVE CONTROL MECHANISM

Jesse J. Shackelford, Fairmont, W. Va., assignor to Fairmont Box Company, Canajoharie, N. Y., a corporation of New York Application June 3, 1953, Serial No. 359,245

10 Claims. (Cl. 121—45)

This invention relates to control mechanism, and more particularly to electro-mechanical valve operating mechanism, for controlling the operation of a fluid-operated piston.

In the conventional type fluid-operated piston, the valves are normally positioned and operated in such a manner that when the piston has come to the end of a stroke, it usually strikes the end of the piston with great force; then an inlet valve is opened introducing fluid under pressure, thus tending to return the piston in the opposite direction, exhaust means being provided at the opposite end of the cylinder. Usually the piston oscillates back and forth continuously, and no means are provided whereby intermittent motion may be imparted thereto. The length of the stroke is usually only limited by the length of the cylinder, so that the striking of the piston against the cylinder end wall is conducive to rapid wear of the cylinder and the piston, due to the metal to metal contact resulting therefrom.

It is an object of this invention, therefore, to provide means for controlling a fluid-operated piston so that the length of the piston stroke may be varied and accurately controlled.

It is another object of this invention to provide means for making both the power and exhaust stroke of the piston shock-free by providing a cushion of air having a controlled volume.

It is a further object of this invention to provide means for operating a plurality of piston control valves in a predetermined timed sequence to impart intermittent oscillatory motion to the piston.

It is still another object of this invention to provide valve means for controlling the volume of pressurized fluid admitted to and exhausted from the cylinder, and hence to control the speed of operation of the piston.

I accomplish these and other objects of my invention by providing a source of fluid under pressure communicating with a cylinder at each end thereof, intake valves for controlling the admission of fluid, exhaust valves, cams for opening and closing the intake and exhaust valves in pairs, electrically-operable means for imparting oscillatory movement to the cams, and switch means for actuating the electrically-operable means in predetermined timed relation, for controlling the length of the piston stroke.

Additional objects of my invention are accomplished by including adjustable valve means positioned between the source of fluid and the cylinder and additional adjustable valve means limiting the flow of exhaust fluid to thereby control the speed of operation of the piston; and by including a pair of shafts mounted longitudinally in a frame for oscillatable movement, the shafts being disposed in end to end relation, in the same horizontal and vertical planes to carry a plurality of spaced cams, which operate the intake and exhaust valves through mechanical linkage.

I further accomplished the objects of my invention by providing as the electrically-operable means a first solenoid for effecting movement of a first cam shaft, mentioned above, in one direction; a second solenoid for effecting movement of said second cam shaft in the same direction and a third solenoid for effecting movement of both cam shafts in the opposite direction to that caused by the first and second solenoids. Linkage is additionally provided, connecting the cores of the second and third solenoids. The first and second solenoids are mounted closely adjacent one another so that actuation of the third solenoid will return the cores of the first and second solenoids to operative position.

While some of the objects of my invention have been set forth above, others will become apparent to those skilled in the art when the specification is read in connection with the accompanying drawings in which:

Figure 1 is a partially schematic side elevation, with some of the parts broken away and others in section showing the piston positioned in the rear of the cylinder, immediately following a complete cycle of operation, Figure 2 is a plan view taken substantially along the line 2—2 in Figure 1 showing the positioning of the control valves.

Figure 3 is a detailed view of the upper portion of Figure 1, with parts omitted for purposes of clarity, to show the manner of mounting the switches and switch actuators.

Figure 4 is a side sectional view taken substantially along the line 4—4 in Figure 1.

Figure 5 is a circuit diagram showing connections which will produce intermittent operation of the piston, and Figure 5-A is a similar circuit diagram for effecting continuous operation of the piston.

In general, the mechanism operates by employing a plurality of electrical contact switches which, when actuated, energize alternately a plurality of solenoids, which operate through mechanical linkage, to control a plurality of cams, which in turn operate intake and exhaust valves in appropriate sequences to control the length and speed of the piston stroke and to provide a shock-free cushion to bring the piston to a stop prior to reversing the direction of the piston. The position of the switch may be adjusted to vary the length of the stroke and manually operable valves may be set to adjust the volume of the intake and exhaust fluid to thus control the speed of operation of the piston.

By making minor adjustments in the electrical circuit, the sequence of operation of the solenoids may be varied to provide a longer period of "dwell" of the piston at one end of the cylinder than that at the other as may be desirable after the completion of an exhaust stroke and before a power stroke. While such control mechanism may be employed in conjunction with any fluid operated piston it is particularly useful in connection with the feeding of articles such as the partition pieces A, into a partition assembly machine shown in U. S. Patent 1,643,357 Wade et al., issued September 27, 1927.

Referring more particularly to the drawings, a cylinder shown in the upper portion of Figure 1 is broadly designated by the numeral 10. A piston 11 is carried therein and attached thereto is piston rod 11a. Figure 1 shows the piston and other mechanism positioned so that the piston 11 is in the rear of the cylinder 10 just after completion of an exhaust stroke. This is the normal position for beginning a cycle of operation.

A suitable mounting for the cylinder is provided in the form of a channel bar 12. Cylinder heads 13 are suitably secured to a flange 14 of the cylinder, as by bolts 15. A projection 16, which may be integral with the cylinder head 13 may be provided and suitably fastened, as by bolts 17, to the channel bar 12.

A substantially rectangular frame, carrying the valves, and the valve operating mechanism, is broadly designated at 20. A pair of cam shafts 21 and 22 are shown mounted in end to end relation on suitable rollers 23. The rollers are suitably mounted, as at 24, on horizontal transverse axes, so that the cam shafts will be freely reciprocably carried thereby for movement in a longitudinal direction.

A first solenoid 25, is suitably fastened to the lower portion of the frame 20 adjacent the medial portion of cam shaft 21, as by welding. The core 25a is shown extended so that when the solenoid is actuated by an electrical impulse, it will be drawn in, causing the cam shaft 21, operated through suitable linkage 26, to be moved to the right in Figure 1, the limits of this movement being determined by a stop member 27.

A second solenoid 30 is shown similarly secured to the frame 20 but positioned adjacent the medial portion of the cam shaft 22. The core 30a is shown drawn in and its stop member 31 contacting the frame of the solenoid 30, the shaft 22, by its linkage connection 32, having already been drawn to its ultimate position to the right in Figure 1.

A third solenoid 40, positioned on the frame 20 adjacent the first solenoid 25, is shown in Figure 1 with its core 40a extended, so that upon receiving an electrical impulse, the core will be drawn in until its movement is limited by the stop member 41. This movement through suitable linkage 42 causes the core 30a of solenoid 30 to become extended and moves the cam shaft 22 to the left in Figure 1. At the time during the cycle of operation that this takes place, the core 25a of solenoid 25 will be drawn in, and the cam shaft 21 which is moved thereby will be positioned to the right in Figure 1, so that its inner end will be contacting the adjacent end of cam shaft 22. Therefore, this movement will cause the cam shaft 21 to also be moved to the left in Figure 1, as well as the core 25a of solenoid 25 which will be pushed by contact with the core 40a to the left in Figure 1.

A cam 50 is shown positioned adjacent the left-hand end of cam shaft 21 for actuating the plunger 51 of an inlet valve, broadly designated at 52, to open same through suitable linkage 53, which is in turn operated by a roller 54 riding up on the cam 50.

In the medial portion of the cam shaft 21 is positioned a cam 55 which actuates the plunger 56 to open an exhaust valve, broadly designated at 57, and which operates through suitable linkage 58, which is in turn operated by a roller 59 riding up on the cam 55.

A cam 60 is shown positioned adjacent the right-hand end of cam shaft 21 for actuating a plunger 61 to open an inlet valve, broadly designated at 62, and which is operated through suitable linkage 63, which is in turn operated by a roller 64 riding up on cam 60. At the right-hand end of cam shaft 22 is positioned a cam 65 for actuating a plunger 66 to open an exhaust valve, broadly designated at 67, which is operated through suitable linkage 68 by virtue of a roller 69 riding up on cam 65.

It will be noted that a pair of bifurcated portions 70 and 71 are provided for pivotly mounting the links 53, 26, 58, 63, 32, and 68 respectively.

A supply pipe 80 which may be connected to a source of compressed air (not shown) is shown positioned forwardly of the valves 52 and 57 for supplying air under pressure thereto. A manually positionable valve 81 is shown in the line 82 for controlling the volume of air to be admitted to the cylinder 10 through the pipe connection 83. An exhaust line 84 is shown connected on one end to the pipe connection 83 and on the other end to the cam-operated exhaust valve 57. A manually adjustable valve 85 is shown in the exhaust line 86 for controlling the volume of exhaust air.

A similar set of valves and valve connections is shown on the right-hand side of Figures 1 and 2, so that it is not deemed necessary to repeat the description of the same, the corresponding parts being designated by prime notations.

A line 87 introduces air from the supply pipe 80 into an inlet pipe 88, which is provided with a manually settable valve 89 for introducing air to the right-hand end of the cylinder 10 when the piston is in the position shown, that is, in the position to begin a cycle of operation. This additional inlet source 88 is provided to compensate for natural leakage and compression of the volume of air confined between the piston and the cylinder head 13 which might cause the piston to gradually creep to the rear a further distance than would be desirable. This is useful primarily when the mechanism is set for intermittent operation due to the fact that there is a relatively long period of "dwell" of the piston in this rear position.

A vertical frame member 90 supports a threaded member 91 on which is threadably mounted a first microswitch 92, the threaded member having knob 93 in a position adjacent its free end to facilitate manual operation thereof. A pair of rails 94 and 95 act as guides for the microswitch 92 when it is being adjusted longitudinally by turning the threaded member 91. A second microswitch 96, Fig. 3, is also threadably mounted on a threaded member 97 also having a knob 98 to facilitate manual turning thereof. The second microswitch 96 is also guided by the rails 94 and 95 during longitudinal adjustment. A vertical support member 99 serves a similar function to that of support member 90 in that it supports the threaded member 97 as well as the guide rails 94 and 95.

A switch-actuating member, broadly designated at 100, is slidably mounted on an additional pair of guide rails 101 and 102 and is suitably linked to the piston rod 11 by means of a connecting rod 103, which imparts oscillatory movement thereto, according to the movement of the piston. The switch-actuating member 100 is provided with a raised beveled portion 100a, which is adapted to depress the contacts 92a of the first switch, and a raised beveled portion 100b, which is adapted to depress the contacts 96a of microswitch 96 thus actuating the switches. It is thus seen that when the piston reaches a point adjacent an end of the cylinder, one of the microswitches 92 or 96 will be closed to actuate one of the solenoids 40 or 30. This point will be further discussed in the description of the circuit diagrams to follow.

Figure 5, representing a circuit diagram for intermittent operation of the piston, shows schematically a line switch 105 for placing an alternating current potential across the terminal blocks 106 and 107. An additional switch 108 (not previously described) is provided so that upon closing the same, solenoid 25 will receive an electrical impulse therefrom, being connected across the terminal blocks 106 and 107 by the line 110 on one side and the line 111 on the other. The closing of switch 92 will cause solenoid 40 to receive an electrical impulse, it being connected across the terminal blocks by lines 112 and 113. The closing of switch 96 will cause solenoid 30 to receive an electrical impulse, it being connected across the terminal blocks by lines 114 and 115.

Cycle of operation

Figure 1 shows the various parts in the position they would normally be in at the end of an exhaust stroke and just before a power stroke, or at the point where the cycle of operation begins. It will be noted that the piston is in the rear position in cylinder 10 and that the intake valve 52 is open, thus subjecting the front portion of the piston 11 to the air pressure that obtains in the supply line 80. As described previously this pressure is balanced by the cushion of air on the back side of the piston, which is made maintained equal to the pressure on the front side of the piston by virtue of the air entering through the additional inlet 88. All the remaining valves are closed.

The cycle of operation begins after the closing of line switch 105 and the closing of switch 108. Switch 108 may be a microswitch and may be closed by the operation of any suitable instrumentality at a time when it is desired that a cycle of operation starts. When switch 108 is closed the core 25a of solenoid 25 will be drawn in, which will cause the cam shaft 21 to be moved to the rear, or to the right in Figure 1. When the cam shaft is thus moved, the intake valve 52 is closed, by virtue of the roller 54 moving off of the cam 50. Exhaust valve 57 is opened by virtue of the roller 59 moving onto the cam 55. Intake valve number 62 is opened by virtue of the roller 94 moving up on the cam 60 and depressing plunger 61. Exhaust valve 67 remains closed, since the cam shaft 22 has not been moved and the roller 69 therefore remains stationary. Thus air enters into the cylinder through intake valve 62, causing the cylinder to move forward while air in the front portion is permitted to escape through exhaust valve 57.

When the piston has moved forward a sufficient distance, the beveled portion 100a of the switch actuating member 100 depresses the contacts 92a of microswitch 92, thus energizing solenoid 40. The energization of solenoid number 40 will cause its core 40a to be drawn in, thus moving the cam shafts 22 and 21 to the left in Figure 1. With both cam shafts 21 and 22 in the forward position, or to the left in Figure 1, exhaust valve 67 is open, intake valve number 62 is closed, exhaust valve 57 is closed and intake valve 52 is open. It is thus seen that the direction of the piston will be reversed before it has had an opportunity to strike the wall of the cylinder head 13. With the intake and exhaust valves thus operating in pairs, air entering through intake valve 52 will drive the piston to the rear, or to the right in Figure 1, and the air in the rear portion of the cylinder will be permitted to escape through exhaust valve 67.

As the piston returns to the rear, the beveled portion 100b of switch-actuating member 100 will depress the contacts 96a of switch 96, thus energizing solenoid 30. This will cause the core 30a of solenoid 30 to be drawn in into its magnetic field, thus moving the cam shaft 22 to the right in Figure 1. This movement will result in the closing of exhaust valve 67 to thus cushion the piston and bring the same to a stop in this rear position. Thus one complete cycle of operation is at an end, and the piston is in position to begin another power stroke upon the closing of switch 108.

Figure 5–A shows a circuit diagram for continuous operation of the piston. It will be observed that the chief difference between this circuit and the one shown in Figure 5 is that switch 108 has been omitted and that the solenoid 25 has been connected so that it will be energized by the closing of switch 96' through the lines 120 and 121. Corresponding prime notations are used to designate the remaining elements of this diagram.

By utilizing such a circuit, it will be noted that after closing the line switch 105', switch 96' being already closed will energize solenoids 25 and 30, which cause the cam shaft 21 to be moved to the right in Figure 1 by virtue of the cores 25a and 30a being drawn into their respective magnetic fields. This movement of the cam shafts causes closing of intake valve 52, opening of exhaust valve 57, opening of intake valve 62, and closing of exhaust valve 57 thus causing the piston 11 to move forward on a power stroke to the point when switch 92' will be actuated. The closing of switch 92' will cause both cam shafts 22 and 21 to move to the left in Figure 1 by virtue of the core 40a of solenoid 40 being drawn into its field with the consequent opening of intake valve 52, closing of exhaust valve 57, closing of intake valve 62 and opening of exhaust valve 57 thus returning the piston to the rear, until switch 96' is again closed, thus effecting continuous operation of the piston.

While the invention has been described as being operated by air under pressure, it is obvious that the device may be adapted so that any type of fluid under pressure may be used for the operation of the piston.

While the invention has been described in the form of a preferred embodiment using specific terms, it will be understood that these terms are used in a descriptive sense only and not for purposes of limitation and that many changes and modifications in form, arrangement of parts and details of construction may be made without departing from the spirit of the invention and that all such changes and modifications as follow within the scope of the appended claims are contemplated as part of this invention.

I claim as my invention:

1. A piston control device comprising, a piston, a cylinder, a source of fluid under pressure communicating with the cylinder adjacent each end thereof, intake valves for controlling the admission of fluid, exhaust valves communicating with the cylinder adjacent each end thereof, a frame, a pair of longitudinal shafts mounted for oscillatable movement in said frame, said shafts being disposed in end to end relation and in the same horizontal and vertical planes, a plurality of spaced cams carried by said shafts for operating said intake and exhaust valves responsive to movement of the shafts, electrically operable means for oscillating said shafts for opening and closing the intake valves and the exhaust valves in pairs and switch means for actuating said electrically operable means in predetermined timed relation, thereby controlling the length of the piston stroke.

2. A piston control device comprising, a piston, a cylinder, a source of fluid under pressure communicating with the cylinder adjacent each end thereof, intake valves for controlling the admission of fluid, exhaust valves communicating with the cylinder adjacent each end thereof, cam means for opening and closing the intake and exhaust valves in pairs, electrically operable means for actuating said cam means, a plurality of adjustably positionable switches for actuating said electrically operable means, a plurality of longitudinally disposed shafts on which said switches are threadably mounted for longitudinal adjustment thereon, longitudinally disposed guide members on which said switches are slidably carried when their position is being adjusted longitudinally on said shafts for varying the length of the piston stroke, a piston rod and means carried by the piston rod for actuating said adjustably positionable switches whereby the length of the piston stroke may be controlled.

3. A piston control device comprising, a frame, first and second cam shafts reciprocably carried by the frame, linkage means for controlling the movement of the cam shafts, a plurality of spaced cams carried by the shafts, electrically operable means for operating said linkage means, variably positionable switch means for actuating said electrically operable means in predetermined timed intervals, a piston, a cylinder within which the piston is oscillatably carried, a source of fluid under pressure communicating with the cylinder adjacent each end thereof, a first intake valve and a first exhaust valve communicating with the cylinder adjacent one end thereof, and a second intake valve and a second exhaust valve communicating with the cylinder at the other end thereof, and linkage means operated by the cams for opening and closing an intake valve on one end of the cylinder and an exhaust valve on the other end of the cylinder in alternate pairs.

4. A piston control device comprising, a frame, first and second cam shafts reciprocably carried by the frame, linkage means for controlling the movement of the cam shafts, a plurality of spaced cams carried by the shafts, electrically operable means for operating said linkage means, variably positionable switch means for actuating the solenoid means in predetermined timed intervals, a piston, a cylinder within which the piston is oscillatably carried, a source of fluid under pressure communicating with the cylinder adjacent each end thereof, a first intake valve and a first exhaust valve communicating with the cylinder adjacent one end thereof, and a second intake valve and a second exhaust valve communicating with the cylinder at the other end thereof, and linkage means operated by the cams for opening and closing an intake valve on one end of the cylinder and an exhaust valve on the other end of the cylinder in alternate pairs, said cams being so positioned that movement of said first cam shaft will operate said first and second intake valves and said first exhaust valve and movement of said second cam shaft will operate said second exhaust valve whereby movement of said first cam shaft will close said first intake valve and said second exhaust valve and open said second intake valve and said first exhaust valve to move the piston in one direction while movement of said second shaft will result in movement of the piston in the opposite direction.

5. A piston control device comprising, a frame, first and second cam shafts reciprocably carried by the frame, linkage means for controlling the movement of the cam shafts, a plurality of spaced cams carried by the shafts, electrically operable means for operating said linkage means, variably positionable switch means for actuating said electrically operable means in predetermined timed intervals, a piston, a cylinder within which the piston is oscillatably carried, a source of fluid under pressure communicating with cylinder adjacent each end thereof, a first intake valve and a first exhaust valve communicating with the cylinder adjacent one end thereof, and a second intake valve and a second exhaust valve communicating with the cylinder at the other end thereof, and linkage means operated by the cams for opening and closing an intake valve on one end of the cylinder and an exhaust valve on the other end of the cylinder in alternate pairs, said electrically operable means comprising, a first solenoid for effecting movement of said first cam shaft in one direction, a second solenoid for effecting oscillatable movement of said second cam shaft in the same direction as said first cam shaft, a third solenoid for effecting movement of both cam shafts in the opposite direction to that caused by said first and second solenoids; a mechanical linkage between the cores of said second and third solenoids and wherein said first and second solenoids are mounted adjacent one another, so that actuation of said third solenoid will return the cores of said first and second solenoids to operating position whereby, when the piston is on an exhaust stroke, actuation of said second solenoid will close said second exhaust valve providing a cushion of fluid against which the piston may dwell until a power stroke is initiated by the actuation of said third solenoid.

6. A valve operating mechanism comprising, first and second oscillatably mounted cam shafts, said cam shafts being mounted in end to end relation in the same horizontal and vertical planes, electrically operable means for effecting movement of said cam shafts, one at a time, in the same direction in a predetermined timed sequence, additional electrically operable means for moving both of the cam shafts in the opposite direction in one movement and a plurality of cams carried by the shafts whereby a plurality of valves may be opened and closed in a predetermined timed sequence.

7. A valve operating mechanism comprising, first and second longitudinally oscillatably mounted cam shafts, said cam shafts being mounted in end to end relation in the same horizontal and vertical planes, a first solenoid for effecting movement of said first cam shaft in one direction, a second solenoid for effecting oscillatable movement of said second cam shaft in the same direction as said first cam shaft, a third solenoid for effecting movement of both cam shafts in the opposite direction to that caused by said first and second solenoids and a plurality of spaced cams carried by said cam shafts for opening and closing the valves.

8. A valve operating mechanism, as set forth in claim 7, including a mechanical linkage between the cores of said second and third solenoids and wherein said first and second solenoids are mounted adjacent one another, so that actuation of said third solenoid will return the cores of said first and second solenoids to operating position.

9. A piston control device comprising, a frame, a plurality of cam shafts reciprocably carried by the frame, a plurality of spaced cams carried by the shafts, electrically operable means for oscillating said cam shafts, switch means for actuating said electrically operable means at predetermined timed intervals, a piston, a cylinder within which the piston is oscillatably carried, a source of fluid under pressure communicating with the cylinder adjacent each end thereof, a first intake valve and a first exhaust valve communicating with the cylinder adjacent one end thereof, a second intake valve and a second exhaust valve communicating with the cylinder at the other end thereof and linkage means operated by the cams for opening and closing an intake valve on one end of the cylinder and an exhaust valve on the other end of the cylinder in alternate pairs.

10. A piston control device comprising, a piston, a cylinder, a source of fluid under pressure communicating with the cylinder adjacent each end thereof, an intake valve for controlling the admission of fluid at each end of the cylinder, an exhaust valve communicating with the cylinder adjacent each end thereof, a plurality of horizontally disposed aligned oscillatably mounted cams, electrically operable means for oscillating said cams for opening an intake valve and an exhaust valve on opposite sides of said piston in pairs in predetermined timed sequences and additional electrically operable means for so positioning one of the cams that on the completion of an exhaust stroke the corresponding exhaust valve will be closed thereby permitting the corresponding intake valve to remain open, whereby the piston may dwell against a cushion of fluid until a power stroke is initiated by closing the corresponding intake valve and opening the other pair of valves.

References Cited in the file of this patent

UNITED STATES PATENTS

| | | |
|---|---|---|
| 625,792 | Naylor | May 30, 1899 |
| 793,596 | Lentz | June 27, 1905 |
| 817,385 | Owens | Apr. 10, 1906 |
| 833,582 | Crawford | Oct. 16, 1906 |
| 1,301,757 | Steffes | Apr. 22, 1919 |
| 1,493,428 | Bucknam | May 6, 1924 |
| 1,496,953 | Stewart | June 10, 1924 |
| 1,899,362 | Stratton | Feb. 28, 1933 |
| 1,927,583 | Ernst | Sept. 19, 1933 |
| 2,375,946 | Reichelt | May 15, 1945 |
| 2,378,697 | Geibel | June 19, 1945 |
| 2,605,785 | Ellsworth | Aug. 5, 1952 |
| 2,616,398 | Emrick | Nov. 4, 1952 |
| 2,655,903 | Tyler | Oct. 20, 1953 |